(12) United States Patent
Kaneda

(10) Patent No.: US 10,884,680 B2
(45) Date of Patent: Jan. 5, 2021

(54) PRINT CONTROL APPARATUS AND CONTROL METHOD FOR RECEIVING AND PRINTING PRINT DATA

(71) Applicant: CANON KABUSHIKI KAISHA, Tokyo (JP)

(72) Inventor: Takeshi Kaneda, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/379,521

(22) Filed: Apr. 9, 2019

(65) Prior Publication Data

US 2019/0317702 A1  Oct. 17, 2019

(30) Foreign Application Priority Data

Apr. 13, 2018  (JP) .................... 2018-077927

(51) Int. Cl.
*G06F 3/12* (2006.01)

(52) U.S. Cl.
CPC ............ *G06F 3/122* (2013.01); *G06F 3/1208* (2013.01); *G06F 3/1239* (2013.01); *G06F 3/1255* (2013.01); *G06F 3/1287* (2013.01)

(58) Field of Classification Search
CPC ...... G06F 3/122; G06F 3/1208; G06F 3/1239; G06F 3/1255; G06F 3/1287; G06F 3/1247; G06F 3/1296
See application file for complete search history.

(56) References Cited

U.S. PATENT DOCUMENTS

| | | | |
|---|---|---|---|
| 2003/0098987 A1 | 5/2003 | Fiske | |
| 2003/0206315 A1* | 11/2003 | Lester | G06F 3/1204 358/1.16 |
| 2018/0113659 A1* | 4/2018 | Matsui | G06F 3/1205 |
| 2020/0050413 A1* | 2/2020 | Kim | G06F 3/1274 |

FOREIGN PATENT DOCUMENTS

JP  2013-187571 A  9/2013

* cited by examiner

*Primary Examiner* — Iriana Cruz
(74) *Attorney, Agent, or Firm* — Canon U.S.A., Inc. IP Division

(57) ABSTRACT

A print control apparatus receives a print job from an external apparatus. In a case where attribute information for performing processing for each set, the set being composed of one or more pages included in a print job, is included in the received print job, the print control apparatus extracts print data, which is to be used for outputting of one set of printed product, from the received print job based on the attribute information. Moreover, the print control apparatus stores, in a storage area, data including the extracted print data to be used for outputting of one set of printed product and a number of copies derived based on at least the attribute information.

11 Claims, 14 Drawing Sheets

FIG. 7A

REQUEST FOR ATTRIBUTE INFORMATION

```
"Hypertext Transfer Protocol"
POST /ipp/print HTTP/1.1/
Content-Length: XXX
Content-Type: application/ipp
Host: XXXX.local:631
User-Agent: CUPS/2.2.3 (XXXOS Version11.0)
Expect: 100-continue "Get-Printer-Attributes";
    operation-id: Get-Printer-Attributes
    request-id: xxx RequestAttributes = {
    "attributes-charset" = "utf-8";
    "attributes-natural-language" = ja-jp;
    "printer-uri" = "ipp://xxxx.local.:631/ipp/print";
    "requested-attributes (keyword)":
711 — "copies-supported",
712 — "job-pages-per-set-supported",
713 — "job-pages-per-set-type",
714 — "document-format-supported",
715 — "job-collation-type",
716 — "pdf-k-octets-supported"
}
```

FIG. 7B

RESPONSE ABOUT ATTRIBUTE INFORMATION

```
"Hypertext Transport Protocol"
HTTP/1.1 200 OK
Server: HTTP Server
Content-Length: XXX
Content-Type: application/ipp
Connection: close "Internet Printing Protocol"
Response =
    operation-attributes-tag {
        "attributes-charset" = "utf-8";
        "attributes-natural-language" = "ja-jp";
    };
    printer-attributes-tag {
721 — copies-supported (integer): 9999
722 — job-pages-per-set-supported (boolean): true
723 — job-pages-per-set-type : normal-job, merge-print-job
724 — document-format-supported
        mimeMediaType value: 'image/pwg-raster'
        mimeMediaType value: 'application/pdf'
725 — job-collation-type
        uncollated-sheets,
        collated-document
726 — pdf-k-octets-supported: 30000
    end-of-attribute-tag
}
```

FIG.8A

JOB GENERATION

```
"Hypertext Transfer Protocol"
  POST /ipp/print HTTP/1.1/
  Content-Length: XXX
  Content-Type: application/ipp
  Host: XXXX.local:811
  User-Agent: CUPS/2.2.3 (XXXOS Version11.0)
  Expect: 100-continue "CreateJob";
    operation-id: CreateJob
    request-id: xxx RequestAttributes= {
        "attributes-charset"= "utf-8"
        "attributes-natural-language"= ja-jp
        "printer-uri"= "ipp://xxxx.local.:811/ipp/print"
        "requesting-user-name"= "AAAA"
        "job-name"= "Test-Job"
        "job-attributes-tag":

<Omitted>

"sides"= "one-sided"
        "print-quality"= "normal"
        "finishings"= "staple-top-left"

811 ~ "copies"= "1"

812 ~ "job-pages-per-set"= "M" (for example, "2")

813 ~ "job-pages-per-set-type"= "normal-job"

814 ~ "job-collation-type"= "collated-document"

<Omitted> end-of-attributes-tag
}
```

FIG.8B

DATA TRANSMISSION

"Hypertext Transfer Protocol"
POST /ipp/print HTTP/1.1/
Content-Type: application/ipp
Host : XXXX.local:811
Transfer-Encoding: chunked
User-Agent: CUPS/2.2.3 (XXXOS Version11.0)
Expect: 100-continue Hypertext Transfer Protocol
Internet Printing Protocol operation-id: Send-Document (0x0006)
   request-id: 5
   operation-attributes-tag
      attributes-charset (charset): 'utf-8'
      attributes-natural-language (naturalLanguage): 'ja-jp'
      printer-uri (uri): 'ipp://5F3D9D.local.:811/ipp/print'
      job-id (integer): 5
      requesting-user-name (nameWithoutLanguage): 'AAAA'
      last-document (boolean): true 821 ~ document-format (mimeMediaType): 'image/pwg-raster' end-of-attributes-tag

DATA OBTAINED BY RASTERIZING N COPIES × M PAGES INTO RASTER DATA
Data (317757 bytes)
   Data: 255044462d312e330a25c4e5f2e5eba7f3a0d0c4c60a3420...
   [Length: 317757]

822

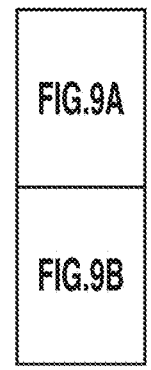
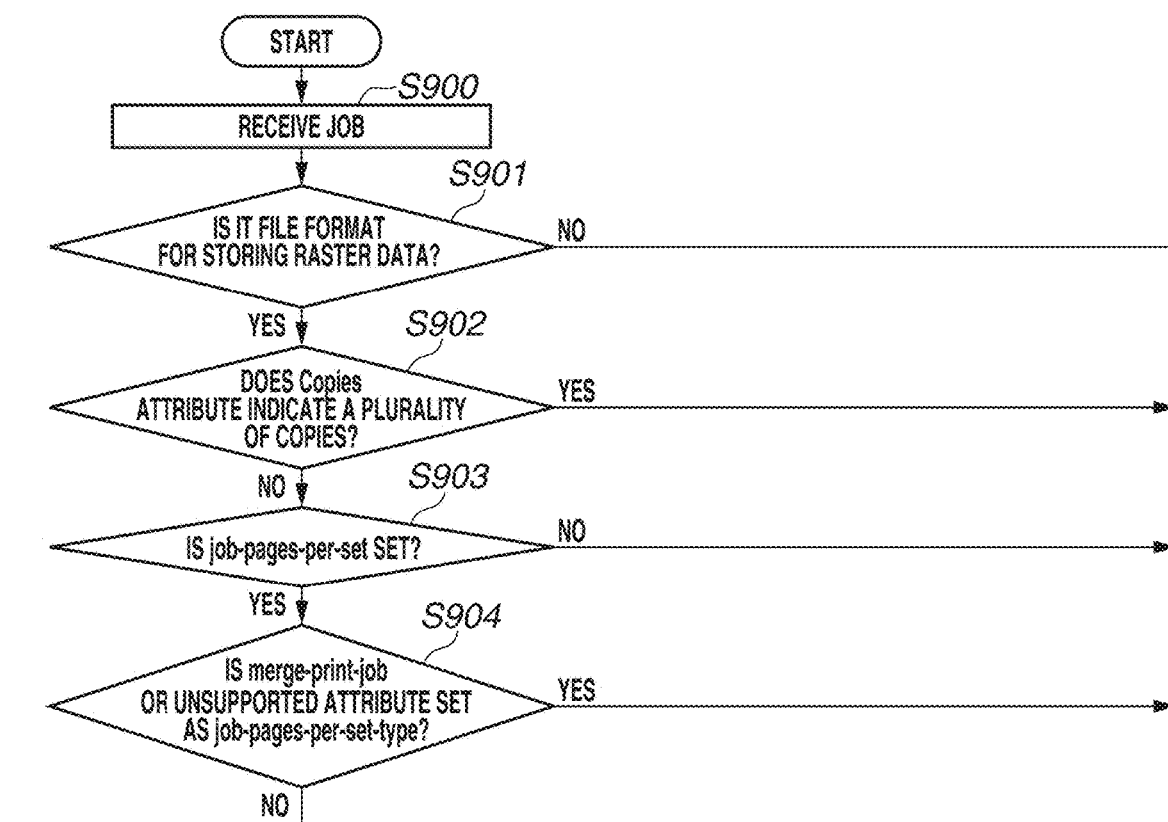

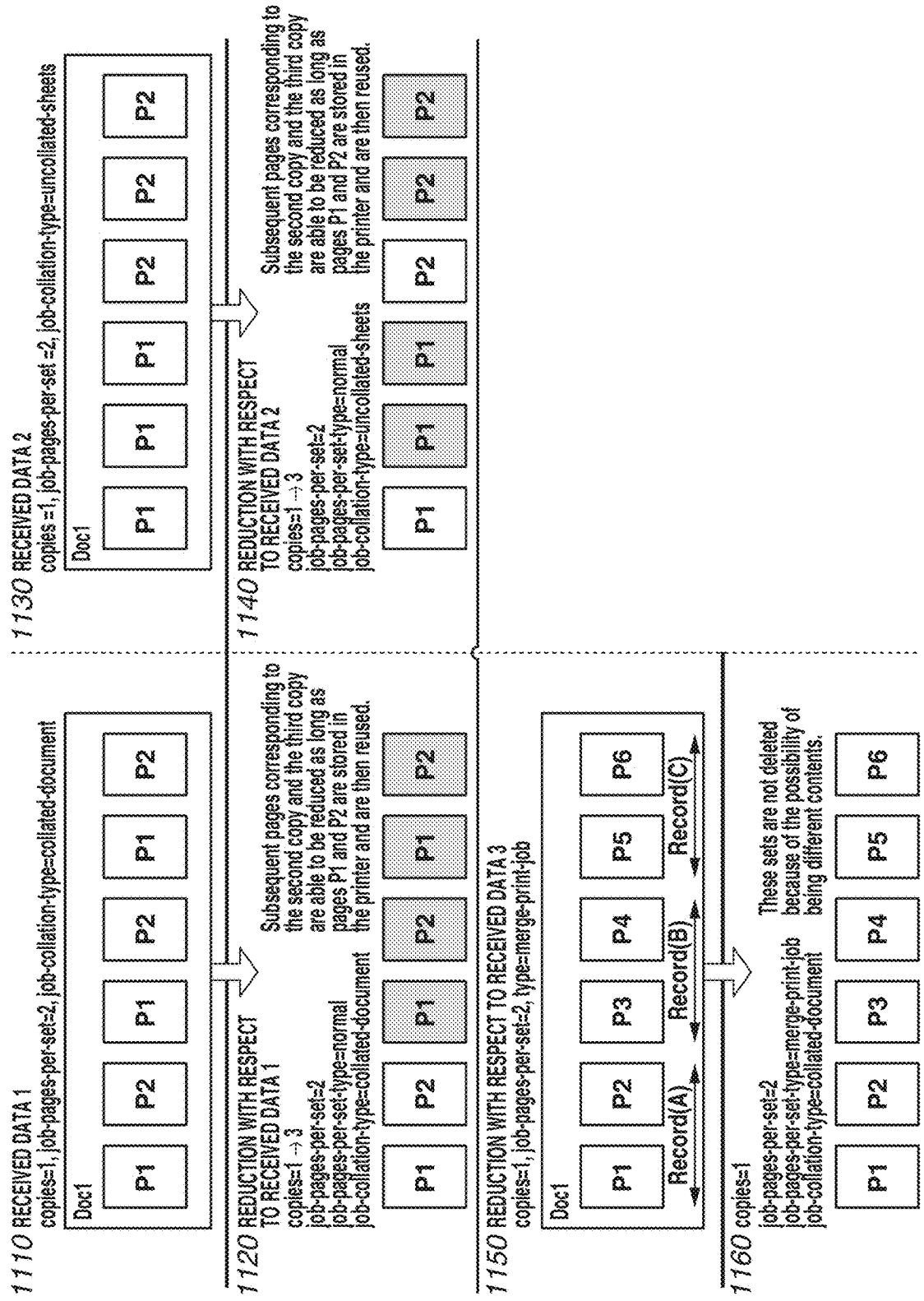

FIG.12A

| SELECTION OF JOB | | |
|---|---|---|
| DOCUMENT NAME | CREATOR | SIZE |
| MEETING MATERIAL.doc | AAAA | 12 MB |
| THIS WEEK'S NOTICE.doc | BBBB | 1 MB |
| ROSTER.xls | CCCC | 3 MB |

~ 1211

[ CANCEL ]  [ EDIT ]  [ PRINT ]

EDITING OF JOB

DOCUMENT NAME: MEETING MATERIAL.doc

CREATOR: AAAA

SIZE: 12 MB

NUMBER OF PAGES: 2 — 1221

NUMBER OF COPIES: 3 — 1222

[ CANCEL ]  [ STORE THE CHANGE ]  [ PRINT ] — 1223

FIG.12C

Printing is in progress.

NUMBER OF PAGES   NUMBER OF COPIES

[ 1 ] / [ 2 ]  ×  [ 1 ] / [ 3 ]

PRINT CONTROL APPARATUS AND CONTROL METHOD FOR RECEIVING AND PRINTING PRINT DATA

BACKGROUND OF THE INVENTION

Field of the Invention

Aspects of the present invention generally relate to a print control apparatus which receives print data and prints the received print data.

Description of the Related Art

Heretofore, there has been known a printing apparatus which receives print data from a communication apparatus via a network and forms an image on a sheet based on the received print data. Moreover, there has also heretofore been known generating print data, which is to be transmitted to a printing apparatus, with use of a printer driver (or a printing application) designed to use individual printing apparatuses.

Moreover, in recent years, there has been known generating print data without a printer driver (or a printing application) designed to use individual printing apparatuses. For example, there has been known a method of generating print data with use of a general-purpose print client, which is provided as a function of an operating system (OS) of a communication apparatus, and transmitting the print data to a printing apparatus. In such a general-purpose print client, a mechanism of performing printing based on a network protocol for causing a printing apparatus to perform printing (Internet Printing Protocol (IPP)) is mounted. Print processing is implemented by the printing apparatus and the communication apparatus performing communication with each other according to such a protocol.

Japanese Patent Application Laid-Open No. 2013-187571 discusses, when an image is selected and an instruction for printing the image is issued on a screen of a communication apparatus, searching for nearby printing apparatuses and displaying a list of the found printing apparatuses. Moreover, Japanese Patent Application Laid-Open No. 2013-187571 discusses selecting a protocol adapted to transmission of image data based on protocol information compatible with the selected printing apparatus and transmitting image data for printing according to the selected protocol.

Moreover, there has been known a printing apparatus having a function called, for example, a hold printing function. Such a printing apparatus having the hold printing function stores, in a storage area, data of a print job transmitted from, for example, a printer driver of a personal computer (PC) or a general-purpose print client. The print data stored in the storage area is printed in response to a user operation being performed on the printing apparatus.

In a printing system that is compliant with specifications of the IPP, the usable formats of print data include, for example, Portable Document Format (PDF) and PWG-Raster. The raster format, such as PWG-Raster format, is mainly used in a case where printing is performed with use of a low-end printing apparatus with, for example, a spool area thereof having a restriction. The above-mentioned low-end printing apparatus is unable to spool data for a plurality of pages. Some print clients compliant with specifications of the IPP can perform rasterization processing of data in such a way as to enable even a printing apparatus with a spool area thereof having a restriction to perform printing of a plurality of copies. In a case where print setting for a plurality of copies (for example, two copies) is performed and a print job is to be transmitted in the raster format, the print client rasterizes print data into raster data having the number of pages x the number of copies, and transmits a print job including the rasterized raster data. For example, in a case where a document with two pages is printed in three copies, raster data included in a print job includes six pages. In this way, if the PWG-Raster format is selected by the print client, the rasterized and thus redundant data would be transmitted.

Furthermore, the print client may in some cases transmit print job data obtained by rasterizing raster data having the number of pages×the number of copies to even an apparatus having the above-mentioned hold printing function.

In these cases, upon receiving the above-mentioned print job data, the apparatus having the hold printing function would store print data including the rasterized and redundant data in a storage area. In this case, there is such an issue that pressure may be put on the storage area (storage), which is prepared for the hold printing function.

SUMMARY OF THE INVENTION

Aspects of the present invention are generally directed to providing a mechanism of, in a case where a print job rasterized for printing of a plurality of copies is received, while reducing the volume of data of the print job, storing data available to output a printed product for a plurality of copies which is desired by the user.

According to an aspect of the present invention, a print control apparatus includes at least one memory that stores a set of instructions, and at least one processor that executes the set of instructions, the set of instructions, when executed, causing the print control apparatus to perform operations comprising receiving, from an external apparatus, a print job for issuing an instruction for printing of a plurality of pages including a plurality of copies of one or more pages, extracting print data, which is to be used for outputting of one set of printed product, from the received print job based on attribute information indicating a number of pages of one set which is to be processed, and storing, in a storage area, data including the extracted print data and a number of copies derived based on a number of pages of the plurality of pages and the attribute information.

Further features of the present invention will become apparent from the following description of embodiments with reference to the attached drawings.

BRIEF DESCRIPTION OF THE DRAWINGS

FIGS. 7A and 7B are diagrams used to explain examples of a request and a response for acquiring attribute information.

FIGS. 8A and 8B are diagrams used to explain an example of a print job.

FIG. 11 is a schematic diagram used to explain extraction of data.

FIGS. 12A, 12B, and 12C are diagrams each illustrating an example of a screen which is displayed on an operation unit of the printing apparatus.

DESCRIPTION OF THE EMBODIMENTS

Various embodiments, features, and aspects of the invention will be described in detail below with reference to the drawings. Furthermore, the following embodiments are not intended to limit the invention set forth in the claims, and not all of the combinations of features described in the embodiments are essential for resolution in the invention.

Figure 1:
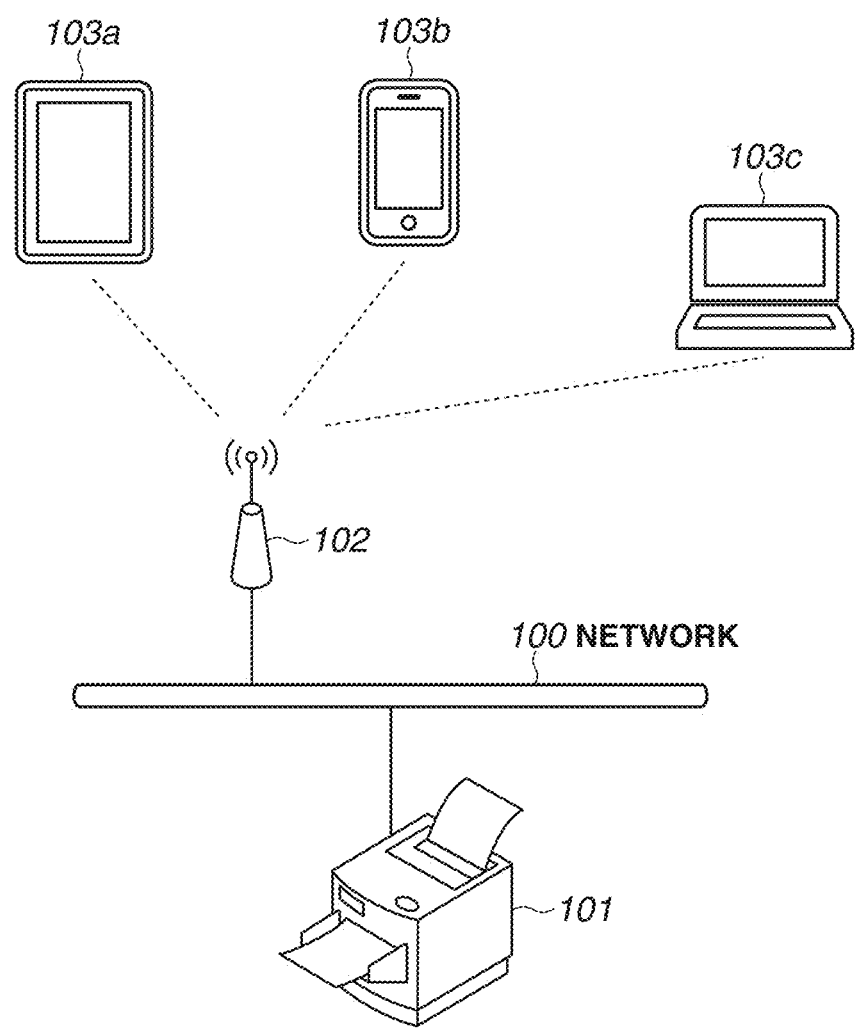
FIG. 1 is a diagram illustrating an example of a printing system.

First, a configuration of a printing system according to an embodiment of the present invention is described with reference to FIG. 1. The printing system according to the present embodiment includes communication apparatuses 103a, 103b, and 103c, a printing apparatus 101, and an access point (AP) 102. The printing apparatus 101 and the AP 102 are interconnected in such a way as to be able to communicate with each other on a network 100. In the present embodiment, the printing apparatus 101 is illustrated as an example of a print control apparatus. Moreover, each of the communication apparatuses 103a, 103b, and 103c is described as an example of a communication apparatus. In the case of the illustrated example, the communication apparatus 103a is a tablet terminal, the communication apparatus 103b is a mobile terminal such as a smartphone, and the communication apparatus 103c is a personal computer (PC).

Each of the communication apparatuses 103a to 103c is able to communicate with the printing apparatus 101 on the network 100 via the AP 102. Furthermore, while, in the present embodiment, the above-described configuration is described as an example of a printing system, the present embodiment is not limited to this configuration. One or more communication apparatuses and a printing apparatus only need to be interconnected in such a way as to be able to communicate with each other via a network. Furthermore, the communication performed via the AP 102 is, for example, a wireless communication compliant with the IEEE 802.11 series. Moreover, the communication apparatus 103 and the printing apparatus 101 can perform intercommunication with use of direct wireless communication via an ad hoc network such as Wi-Fi Direct® or Wi-Fi Aware®.

First, the printing apparatus 101 is described. The printing apparatus 101 is able to perform print processing based on a print job received from an external apparatus via a network. Moreover, the printing apparatus 101 in the present embodiment has a hold printing function. In a case where the hold printing function is set enabled, the printing apparatus 101 stores, in a storage area (a data accumulation unit 318 described below), data of a print job transmitted from a printer driver of a PC or an external apparatus such as a general-purpose print client. Print data stored in the storage area is then printed in response to a user operation being performed on the printing apparatus 101.

<Configuration of Printing Apparatus>

Figure 2:
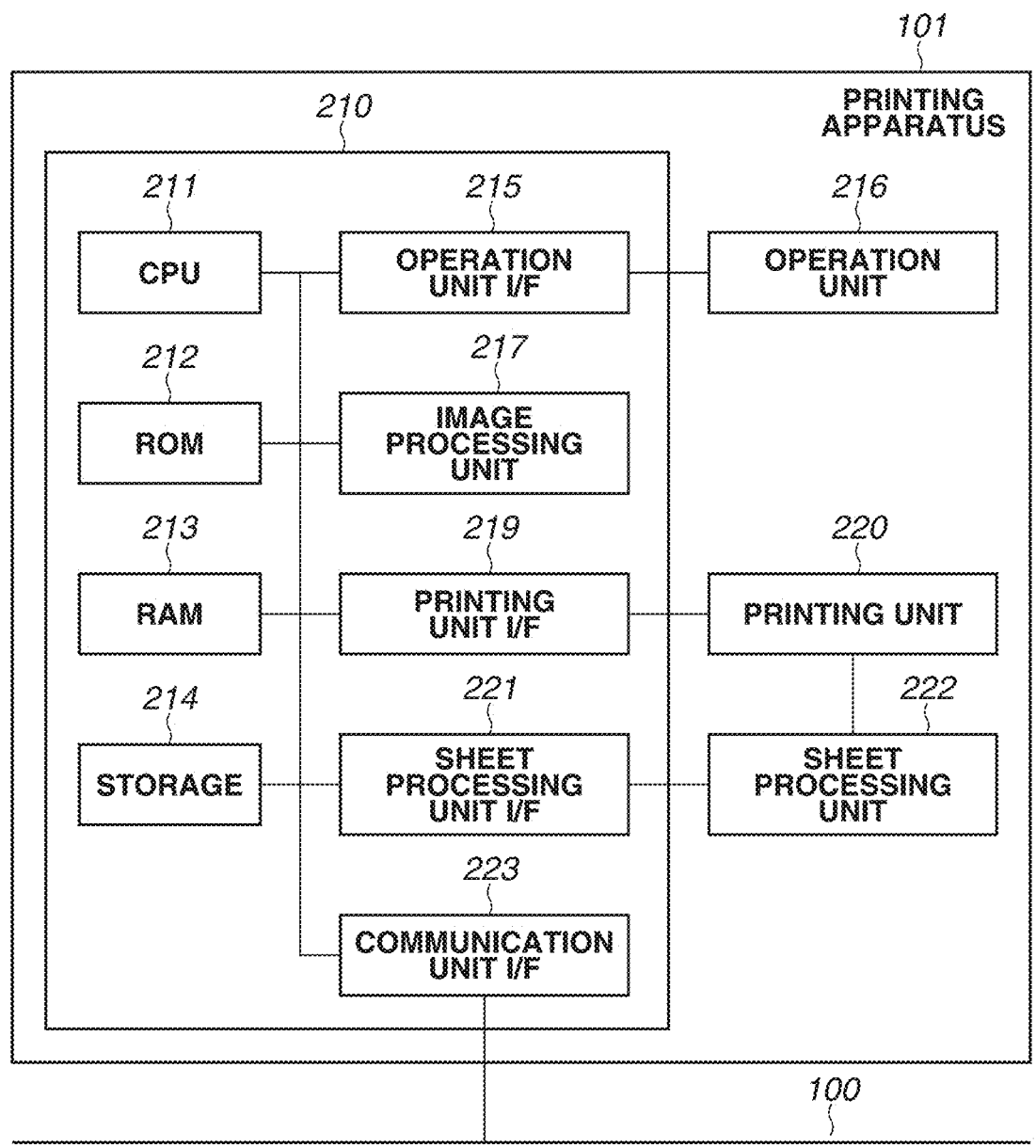
FIG. 2 is a diagram illustrating an example of a hardware configuration of a printing apparatus.

FIG. 2 is a block diagram illustrating a hardware configuration of the printing apparatus 101. Furthermore, while, in the present embodiment, the printing apparatus 101 is described as an example of a print control apparatus, the present embodiment is not limited to this. For example, the print control apparatus can be, for example, a multifunction peripheral (MFP), which has, in addition to a printing function, a function of reading a document.

A control unit 210, which includes a central processing unit (CPU) 211, controls an operation of the entire printing apparatus 101. The CPU 211 reads out control programs stored in a read-only memory (ROM) 212 or a storage 214, and performs various control operations, such as printing control or reading control, according to the control programs. The ROM 212 stores control programs which are executable by the CPU 211. A random access memory (RAM) 213, which is a main storage memory for the CPU 211, is used as a work area or a temporary storage area used for loading various control programs. The storage 214 stores data of a print job, image data, various programs, and various pieces of setting information. Data of a print job to be temporarily stored by the hold printing function is stored in a storage area in the storage 214. While, in the present embodiment, an auxiliary storage device such as a hard disk drive (HDD) is assumed to be used as the storage 214, a non-volatile memory such as a solid state drive (SSD) can be used instead of the HDD. In this way, pieces of hardware, such as the CPU 211, the ROM 212, the RAM 213, and the storage 214, constitute what is called a computer.

Furthermore, while, in the printing apparatus 101 in the present embodiment, one CPU 211 performs various processing operations illustrated in the flowcharts described below with use of one memory (RAM 213), a different configuration can be employed. For example, a plurality of CPUs, RAMs, ROMs, and storages can cooperate to perform various processing operations illustrated in the flowcharts described below. Moreover, a hardware circuit, such as an application specific integrated circuit (ASIC) or a field-programmable gate array (FPGA), can be used to perform some processing operations.

An operation unit interface (UF) 215 connects an operation unit 216 and the control unit 210. The operation unit 216 is equipped with a liquid crystal display unit having a touch panel function and various hardware keys, and functions as a display unit, which displays information, and a reception unit, which receives an instruction from the user.

An image processing unit 217 has a raster image processor (RIP) function of rasterizing a print job to form a print image, which is to be used for printing. Moreover, the image processing unit 217 is able to perform resolution conversion or correction processing on image data. Furthermore, while, in the present embodiment, the image processing unit 217 is assumed to be implemented by a hardware circuit (for example, an ASIC or an FPGA), the present embodiment is not limited to this. For example, the printing apparatus can further include a processor designed for image processing purposes, and image processing or rasterization processing for print data can be implemented by the processor executing an image processing program. In this case, such a processor and the CPU 211 are assumed to cooperate to implement the flowcharts described below. Additionally, the CPU 211 can be configured to execute a program for performing image processing, thus performing image processing or rasterization processing for print data. Moreover, image processing can be performed by a combination of any of these methods.

A printing unit I/F 219 connects a printing unit 220 and the control unit 210. A print image generated by the image processing unit 217 analyzing print data is transferred from the control unit 210 to the printing unit 220 via the printing unit I/F 219. The printing unit 220 receives a control command and a print image via the control unit 210, and prints an image on a sheet fed from a paper feed cassette (not illustrated) based on the print age. Furthermore, the printing method used for the printing unit 220 can be an electrophotographic method or can be an inkjet method. Moreover, another printing method, such as a thermal transfer method, can be employed. A sheet processing unit a 221 connects the control unit 210 and a sheet processing unit 222. The sheet processing unit 222 receives a control command from the CPU 211, and performs post-processing on the sheet printed by the printing unit 220 according to the control command. For example, the sheet processing unit 222 performs post-processing, such as sorting a plurality of sheets, punching holes in sheets, and binding a plurality of sheets. Moreover, the control unit 210 is connected to the network 100 via a communication unit I/F 223. The communication unit I/F 223 transmits capability information or status information to a communication apparatus on the network 100 and receives a print job from a communication apparatus on the network 100.

As mentioned above, the printing apparatus 101 in the present embodiment has a hold printing function. Whether to enable the hold printing function is assumed to be previously set by the administrator of the printing apparatus 101 and to be stored in the storage 214. In a case where the hold printing function is set as enabled as an operation setting of the printing apparatus 101, the printing apparatus 101 stores, in the storage area in the storage 214, data of a print job transmitted from a printer driver of a PC or a general-purpose print client. Print data stored in the storage area is printed in response to a user operation being performed on the printing apparatus 101.

Furthermore, in the case of performing printing compliant with specifications of the Internet Printing Protocol (IPP), the usable formats of print data include, for example, Portable Document Format (PDF) and PWG-Raster. The raster format, such as PWG-Raster format, is mainly used in a case where printing is performed with use of a low-end printing apparatus with, for example, a spool area thereof having a restriction. The above-mentioned low-end printing apparatus is unable to spool data for a plurality of pages. Some print clients compliant with specifications of the IPP included in the communication apparatus 103 can perform rasterization processing of data in such a way as to enable even a printing apparatus with a spool area thereof having a restriction to perform printing of a plurality of copies. In a case where print setting for a plurality of copies (for example, two copies) performed and a print job is to be transmitted in the raster format, the print client rasterizes print data into raster data having the number of pages×the number of copies, and transmits a print job including the rasterized raster data. For example, in a case where a document with two pages is printed in three copies, raster data included in a print job includes six pages.

Here, if data of a print job including the rasterized raster data having the number of pages×the number of copies is stored on an apparatus having the above-mentioned hold printing function, although printing is able to be performed as long as there is data used for printing of one copy, the rasterized and redundant data would be stored. In this case, there is such an issue that pressure may be put on the storage area in the storage 214, which is prepared for the hold printing function.

In view of the above-mentioned issue, the present embodiment provides a mechanism of, in a case where a print job rasterized for printing of a plurality of copies is received, while reducing the volume of data of the print job, storing data available to output a printed product for such a plurality of copies. Hereinafter, a specific implementation method is described.

Figure 3:
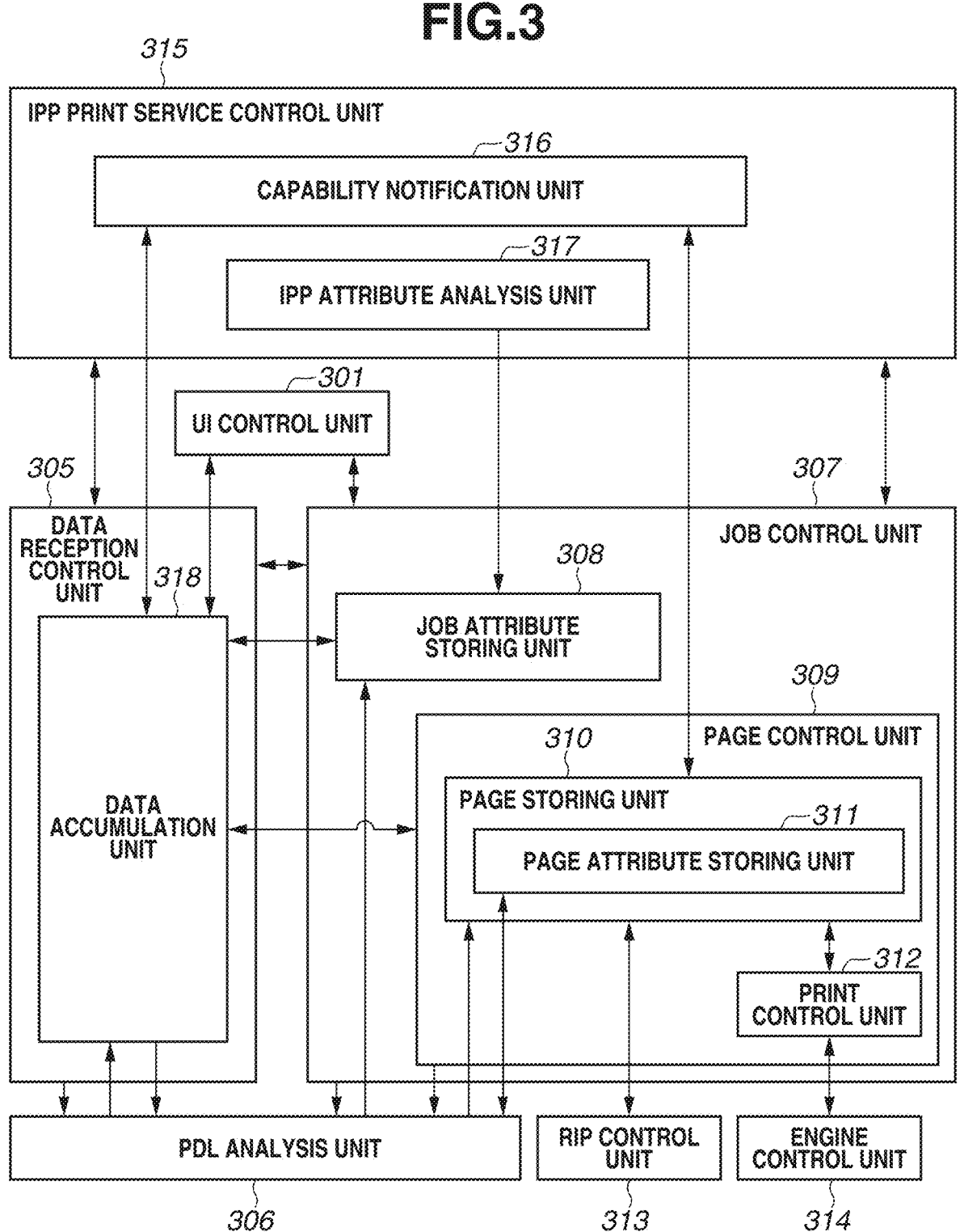
FIG. 3 is a diagram illustrating an example of a software configuration of the printing apparatus.

FIG. 3 is a diagram illustrating an example of a software configuration of the printing apparatus 101. The various functional blocks illustrated in FIG. 3 are implemented by the CPU 211 executing a program loaded on the RAM 213.

An IPP print service control unit 315 includes a capability notification unit 316, The capability notification unit 316 receives an inquiry about the capability of the printing apparatus 101 from the communication apparatus 103, and notifies the communication apparatus 103 of attribute information indicating the capability which the printer (printing apparatus 101) has. The attribute information includes information about, for example, a data format which is acceptable by the printing apparatus 101 and a data configuration method which is acceptable by the printing apparatus 101.

After acquiring attribute information about the printer (printing apparatus 101), the communication apparatus 103 generates a print job of the format acceptable by the printing apparatus 101, and transmits the print job to the printing apparatus 101. The IPP print service control unit 315 receives a print job compliant with the IPP transmitted from the communication apparatus 103 to the printing apparatus 101.

Upon receiving the print job compliant with the IPP from the communication apparatus 103, in cooperation with a job control unit 307, the IPP print service control unit 315 generates a new job for managing printing. Next, an IPP attribute analysis unit 317 stores, in a job attribute storing unit 308, a job attribute (for example, the number of copies for printing, the number of pages per bundle, the designation of collation, and the setting of finishing) and a document attribute (for example, the designation of format), which have been obtained by analyzing the attribute of the received print job.

In parallel with analyzation processing of the attribute, the IPP print service control unit 315 transfers rendering data included in the received print job to a data reception control unit 305, and then temporarily stores the rendering data in the data accumulation unit 318. The data accumulation unit 318 is a buffer area used to temporarily store data about the received print job.

Next, in a case where the data format of the print job is a raster format, such as PWG-Raster, in cooperation with a PDL analysis unit 306, the job control unit 307 attempts to reduce the data size of a print job accumulated in the data accumulation unit 318. Furthermore, details of the reduction processing are described in a flowchart described below. The reduction processing enables extracting data required for printing of one copy and thus reducing redundant data. Moreover, the job control unit 307 updates the number of copies for printing stored in association with the corresponding print job, thus implementing holding of the print job.

Printing of data stored in the data accumulation unit 318 is started in response to an instruction for printing being issued via the operation unit 216 of the printing apparatus 101. A user interface (UI) control unit 301 provides various screens regarding hold printing to the user. Specifically, the UI control unit 301 displays, on the operation unit 216, an operation screen related to execution of a print job accumulated in the data accumulation unit 318 by the hold printing function. Moreover, the UI control unit 301 displays, on the operation unit 216, for example, a screen for changing the setting of a print job and an indicator indicating the execution status. When detecting that a user operation to execute a print job has been performed via the operation unit 216, the UI control unit 301 requests the job control unit 307 to execute the corresponding print job.

The job control unit 307 requests the PDL analysis unit 306 to analyze rendering data of the print job.

The PDL analysis unit 306 supports two page description languages (PDLs), i.e., PDF and PWG-Raster, and generates page data from PDL data. The generated page data is used for reduction processing for reducing data size (data size reduction processing or data reduction processing) and used for print processing.

First, the reduction processing for reducing data size is described. Upon receiving a request from the job control unit 307, the PDL analysis unit 306 requests rendering data corresponding to the print job from the data reception control unit 305. The data reception control unit 305 transfers the rendering data to the PDL analysis unit 306. The PDL analysis unit 306 generates page data for use in printing based on the transferred rendering data, and transfers the page data to a page storing unit 310. The job control unit 307 attempts to perform data reduction processing for use in a flowchart described below based on the page data transferred to the page storing unit 310 and print attribute information stored in the job attribute storing unit 308.

Next, print processing is described. Upon receiving a user instruction for starting printing, the job control unit 307 requests the PDL analysis unit 306 to perform analysis processing of rendering data corresponding to a print job corresponding to the instruction. Page data analyzed by the PDL analysis unit 306 is transferred to the page storing unit 310. Moreover, the job control unit 307 stores page attribute information corresponding to the transferred page data in a page attribute storing unit 311.

The page data stored in the page storing unit 310 is subjected to RIP processing by the RIP control unit 313 as needed and is thus converted into a print image. In cooperation with the image processing unit 217, the RIP control unit 313 generates a print image.

A print control unit 312 acquires a print image subjected to RIP, performs color separation into pieces of image data of cyan, magenta, yellow, and black (CMYK), and transfers the pieces of image data to an engine control unit 314. The engine control unit 314 receives the pieces of image data of the respective CMYK on a page-by-page basis from the print control unit 312, and controls the printing unit 220 to print a print image on a sheet.

<Configuration of Communication Apparatus>

Figure 4:
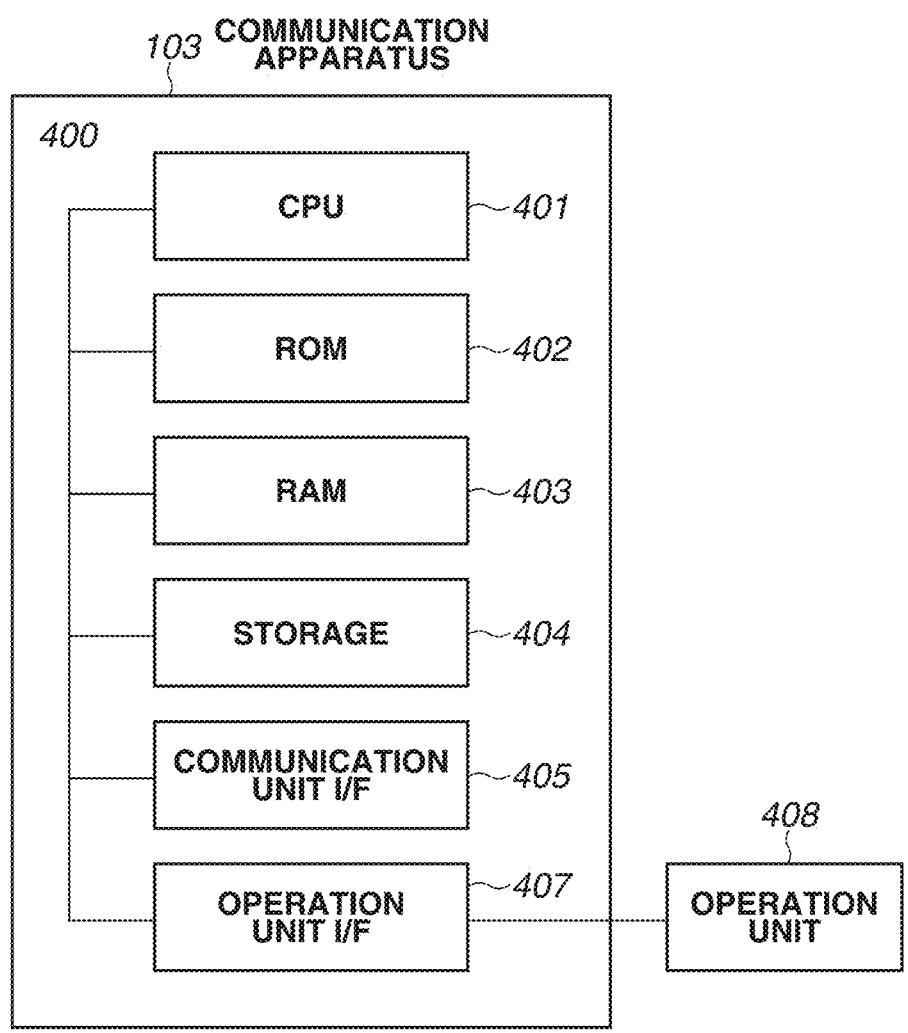
FIG. 4 is a diagram illustrating an example of a hardware configuration of a communication apparatus.

Next, a configuration of each of the communication apparatuses 103a to 103c is described. Each of the communication apparatuses 103a to 103c includes a print client compliant with the IPP, and is able to transmit a print job to the printing apparatus 101. FIG. 4 is a diagram illustrating an example of a hardware configuration of each of the communication apparatuses 103a to 103c. A control unit 400, which includes a CPU 401, controls an operation of the entire communication apparatus 103. The CPU 401 loads a program stored in a ROM 402 or a storage 404 onto a RAM 403, and executes the program to perform various control operations, such as controlling of a print setting screen, generation of print data, and transfer of a print job. The ROM 402 stores, for example, control programs which are executable buy the CPU 401 and a boot program. The RAM 403, which is a main storage memory for the CPU 401, is used as a work area or a temporary storage area used for loading various programs. The storage 404 stores an OS, applications, an OS printing framework, a print job generated by the OS printing framework, and various pieces of setting information. A communication unit OF 405 is a network interface capable of performing transmission and reception of data between the communication apparatus 103 and the printing apparatus 101 on the network 100.

An operation unit 408 is connected to an operation unit I/F 407. The operation unit 408 is a touch panel functioning as a display unit for displaying a screen concerning each application and a print setting screen and a reception unit for receiving a user operation.

Figure 5:
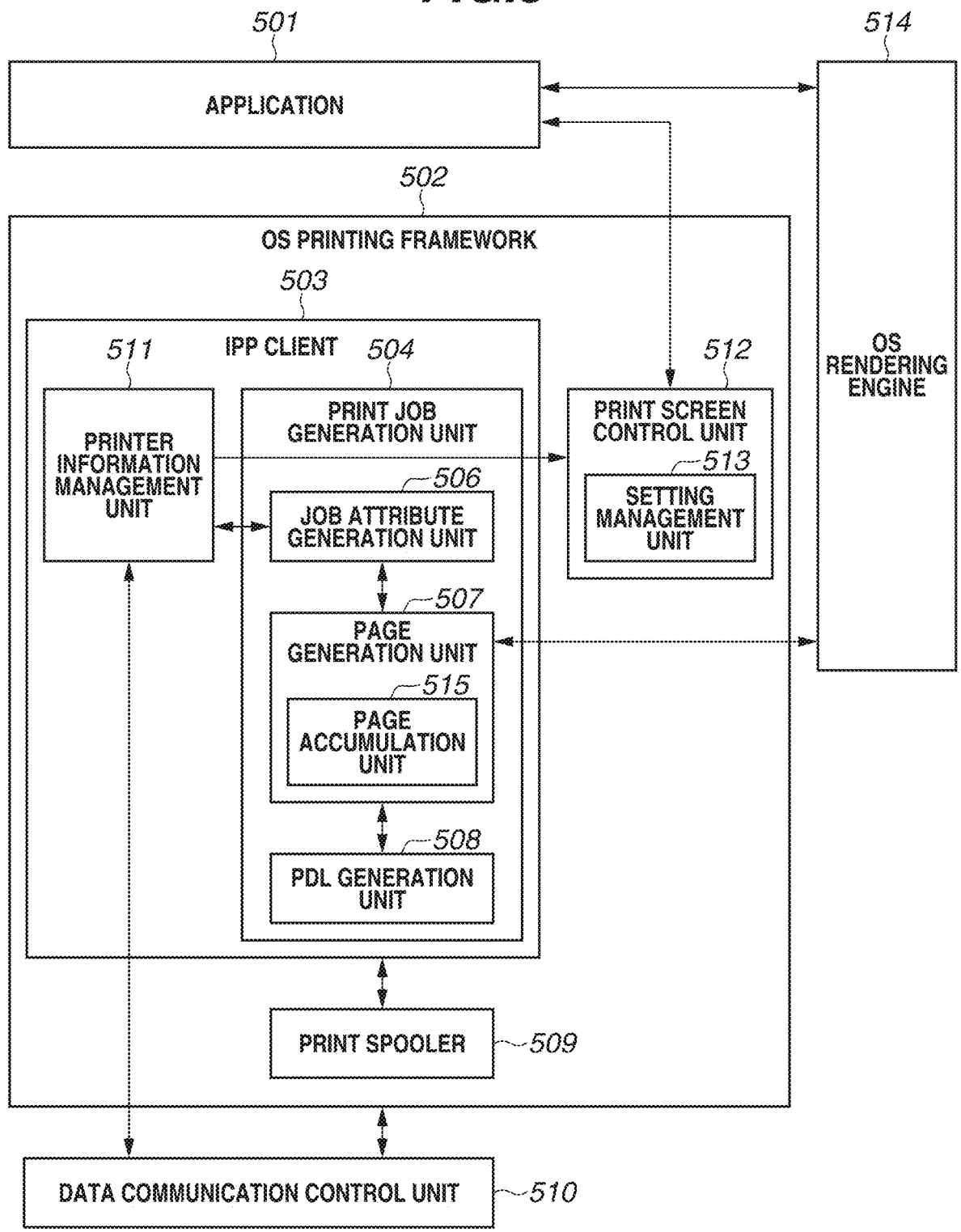
FIG. 5 is a diagram illustrating an example of a software configuration of the communication apparatus.

Next, an example of a software configuration of each of the communication apparatuses 103a to 103c in the present embodiment is described with reference to FIG. 5. Furthermore, each functional block illustrated in FIG. 5 is assumed to be implemented by the CPU 401 executing a program loaded onto the RAM 403.

An application 501 is an optional application installed on the communication apparatus 103 by the user and is a general application such as a word processor, a spreadsheet, an e-mailer, or a web browser. Moreover, an OS printing framework 502 includes an IPP client 503, a print spooler 509, and a print screen control unit 512. The IPP client 503 includes a printer information management unit 511 and a print job generation unit 504. The printer information management unit 511 inquires of a printer such as the printing apparatus 101 via a data communication control unit 510 about attribute information, thus acquiring attribute information about the printing apparatus 101, and then stores the acquired attribute information. This information is referred to as needed by the print job generation unit 504 or the print screen control unit 512.

The print screen control unit 512 displays a print setting screen in response to invocation of the application 501. The user can perform print setting via the print setting screen and issue an instruction for printing start. Furthermore, a setting screen and setting items which are displayed by the print screen control unit 512 are customized as appropriate in such a way as to enable setting adapted to the printing apparatus 101 based on, for example, the attribute information about the printing apparatus 101 stored in the printer information management unit 511 and a default setting stored in a setting management unit 513. The setting management unit 513 manages, for example, the default setting and a print setting which is in the process of being set via the setting screen.

Moreover, an OS rendering engine 514 converts content which is to be printed into a rendering format included in the OS as standard equipment according to an instruction from the application 501. Page data converted into the rendering format included in the OS as standard equipment is transferred to a page generation unit 507 of the print job generation unit 504.

The print job generation unit 504 includes a job attribute generation unit 506, the page generation unit 507, and a PDL generation unit 508. The print job generation unit 504 generates a print job in response to receiving an instruction from the print screen control unit 512. The job attribute generation unit 506 generates a job attribute and a document attribute of the IPP job based on the setting items in the print screen and the capability information about the printing apparatus 101. The generated attribute information is transmitted as an IPP packet to the printing apparatus 101 via the print spooler 509 and the data communication control unit 510.

The page generation unit 507 includes a page accumulation unit 515. The page generation unit 507 stores, in the page accumulation unit 515, page data which has been generated by the application 501 via the OS rendering engine 514.

The PDL generation unit 508 converts page data accumulated in the page accumulation unit 515 into a format which is supported by the printing apparatus 101. The print job generation unit 504 acquires formats which are supported by the printing apparatus 101 from the printer information management unit 511, and then determines a format into which to convert page data. The PDL generation unit 508 generates PDL data based on the determined format.

In the present embodiment, the printing apparatus 101 is assumed to support PDF and PWG-Raster. In a case where a printing apparatus serving as a destination supports both PDF and PWG-Raster, the communication apparatus 103 is assumed to perform control to preferentially select PDF. On the other hand, in a case where the printing apparatus serving as a destination does not support PDF or is unlikely to perform job generation with PDF, the communication apparatus 103 is assumed to select PWG-Raster. Furthermore, PWG-Raster is merely an example, and another raster format can also be employed. Moreover, PDF is merely an example, and PDL such as XML Paper Specification (XPS) can also be employed.

The page data converted into the format supported by the printing apparatus 101 is transferred to the print spooler 509. The data communication control unit 510 controls transmission and reception of data compliant with the IPP with respect to the printing apparatus 101. In cooperation with the data communication control unit 510, the OS printing framework 502 transmits the job attribute and the document attribute, which have been generated by the job attribute generation unit 506, and the page data, which has been transferred to the print spooler 509, to the printing apparatus 101.

Next, page rasterization processing in a case where PWG-Raster is used is described. In a case where the printing apparatus serving as a destination does not support the PDF format and performing printing of a plurality of copies is set by a user operation, the IPP client 503 performs rasterization processing for rasterizing page data into "the number of pages×the number of copies". Moreover, even in a case where the printing apparatus serving as a destination supports PDF, if a PDF file generated by the PDL generation unit 508 exceeds a receivable data size communicated from the printing apparatus, the TPP client 503 attempts to perform transmission with PWG-Raster instead of PDF. In this case, if performing printing of a plurality of copies is set, the IPP client 503 performs rasterization processing for rasterizing page data into "the number of pages×the number of copies".

Figure 6:
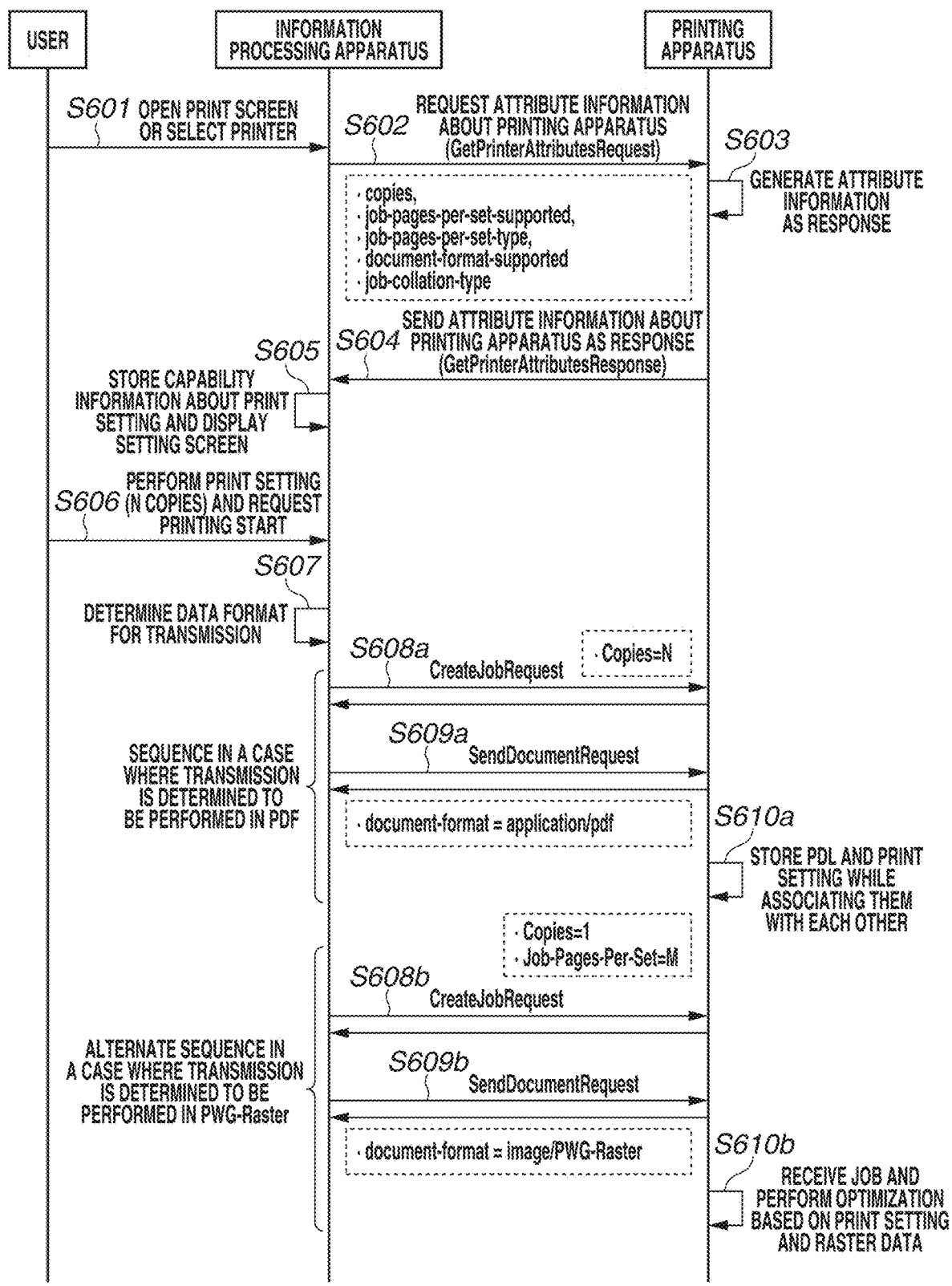
FIG. 6 is a sequence diagram illustrating an example of a processing procedure in the printing system.

Next, an example of a printing sequence compliant with the IPP in the present embodiment is described with reference to FIG. 6.

In step S601, the user performs an operation to execute printing, via a screen of the application 501 of the communication apparatus 103 (an information processing apparatus). In step S602, the printer information management unit 511 of the communication apparatus 103, which has received a user operation to execute printing, transmits an attribute information request (GetPrinterAttributesRequest) to the printing apparatus 101. In step S603, the capability notification unit 316 of the printing apparatus 101, which has received the attribute information request, generates capability information (GetPrinterAttributesResponse) about the printing apparatus 101, and, in step S604, the capability notification unit 316 sends the generated capability information as a response. The attribute information is described as follows with reference to FIGS. 7A and 7B. FIG. 7A illustrates an example of a request for attribute information, and FIG. 7B illustrates an example of a response to the request.

The request for attribute information includes pieces of information 711 to 716 for inquiring about the capability of the printer (printing apparatus 101). "copies-supported" indicated by the information 711 is information for inquiring whether the designation of the number of copies is supported. Moreover, "job-pages-per-set-supported" indicated by the information 712 is information for inquiring whether a job in which a set (bundle) indicating a unit of processing for performing processing (for example, post-processing) in a print job has been designated is supported. Moreover, "job-pages-per-set-type" indicated by the information 713 is information for inquiring about the support type of the designation of a set. "document-format-supported" indicated by the information 714 is information for inquiring about the data format which is supportable by the printing apparatus 101. "job-collation-type" indicated by the information 715 is information for inquiring whether the designation of collation is supported. Moreover, "pdf-k-octets-supported" indicated by the information 716 is information for inquiring about the maximum reception size at the time of reception of PDF. Furthermore, the printer information management unit 511 can inquire about attribute information other than the above-mentioned pieces of information (for example, support information concerning post-processing or support information concerning paper).

FIG. 7B illustrates an example of a capability response which the printing apparatus 101 having received the attribute information request illustrated in FIG. 7A sends in response to the attribute information request.

Information 721 is a response to the information 711. The printing apparatus 101 supports the designation of the number of copies and, therefore, sends, as a response, information indicating that the printing apparatus 101 is able to receive the designation of the number of copies up to 9,999 copies. Information 722 is a response to the information 712. The printing apparatus 101 supports a job in which a set (bundle) indicating a unit of processing for performing processing (for example, post-processing) in a print job has been designated and, therefore, sends, as a response, information indicating "true". Information 723 is a response to the information 713. The printing apparatus 101 supports a normal job and a merge print job as the method of designation of a set and, therefore, sends, as a response, information indicating such a support type. Furthermore, "merge-print-job" is an example of an attribute type indicating that variable data printing, in which contents may be changed in units of sets (bundles) and processing (for example, post-processing) is performed individually for each of the contents, is supported. Moreover, "normal-job" is an example of an attribute type indicating that print processing in which the same content is used in units of sets (bundles) is supported.

Information 724 is a response to the information 714. The printing apparatus 101 supports the PDF format and the PWG-Raster format and, therefore, sends, as a response, information indicating such two formats. Information 725 is a response to the information 715. The printing apparatus 101 sends, as a response, information indicating the support type of collation mode.

Lastly, information 726 is a response to the information 716. The printing apparatus 101 in the present embodiment is able to receive PDF of the size up to 30,000 kilobytes and, therefore, sends, as a response, information indicating 30,000 kilooctets. In this way, the communication apparatus 103 is able to acquire attribute information about the printer serving as a destination.

Furthermore, in the present embodiment, the case of inquiring about the capability with use of pieces of attribute information 711, 712, 711, 715, and 716, which are defined as the specifications of the IPP by the Printer Working Group (PWG) as examples of attribute information, is described as an example. Moreover, information 713 is illustrated as an example of an extended specification which is currently not incorporated in the specifications of the IPP. This extended specification is combined with "job-pages-per-set" and corresponds to attribute information aiming at enabling performing variable data printing even in the IPP printing.

Referring back to FIG. 6, in step S605, the communication apparatus 103, which has received the response sent in step S604, stores the attribute information about the printer serving as a destination (printing apparatus 101) in the printer information management unit 511 based on the received response. Additionally, the communication apparatus 103 displays a print setting screen based on the received attribute information.

In step S606, the user changes the print setting via the print setting screen, and performs an operation to start printing. Here, a case where the number of copies (N copies) has been set by the user operation is illustrated as an example. In step S607, the communication apparatus 103, which has received the operation to start printing performed via the print setting screen, determines the data format of PDL based on, for example, the print setting performed via the print setting screen and the attribute information stored in the printer information management unit 511.

First, a case where transmission of the data format of PDT is determined to be performed in PDF is described. In step S608a, the communication apparatus 103 generates a job request, and transmits the generated job request to the printing apparatus 101. In the job request, "Copies=N" is set as the print attribute of a job. The printing apparatus 101 is able to refer to the attribute value of "Copies" and determine the number of copies for printing. The printing apparatus 101, which has received the job request, sends a response indicating that it is OK. Next, in step S609a, the communication apparatus 103 transmits documents data (PDF data) to the printing apparatus 101. The attribute indicating that the document format is PDF is appended to the document attribute assigned to the document data.

In step S610a, the printing apparatus 101, which has received the job request transmitted in step S608a and the document data transmitted in step S609a, stores, in the storage area, the print setting (the number of copies N for printing and other print settings) included in the job request and the PDF data while associating them with each other. The PDF data is stored in the data accumulation unit 318, and the print setting is stored in the job attribute storing unit 308.

Next, a case where transmission of the data format of PDT is determined to be performed in PWG-Raster is described. In a case where the printing apparatus 101 serving as a destination does not support the PDF format or in a case where, even if the printing apparatus 101 supports the PDF format, the PDF data exceeds the maximum reception size, the communication apparatus 103 transmits document data converted into PWG-Raster.

In step S608b, the communication apparatus 103 transmits a job generation request to the printing apparatus 101. In the job generation request, "Copies=1" and "job-pages-per-set=M" are set as the print attribute of a job. Furthermore, M indicates the number of pages corresponding to one copy. The printing apparatus 101, which has received the job generation request, sends a response indicating that it is OK. Next, in step S609b, the communication apparatus 103 transmits document data (raster data rasterized into N copies×M pages) to the printing apparatus 101. The attribute indicating that the document format is PWG-Raster is appended to the document attribute assigned to the document data.

In step S610b, the printing apparatus 101, which has received the job generation request transmitted in step S608b and the document data transmitted in step S609b, performs optimization based on the print setting (job-pages-per-set or another print setting) included in the job generation request and the raster data. The data subjected to optimization is stored in the storage area. FIGS. 8A and 8B illustrate examples of the job generation request and the document data for transmission in a case where page data is transmitted in the PWG-Raster format. FIG. 8A illustrates an example of the job generation request. Here, a case where N copies, one-sided printing, the print quality being normal, and stapling at the top left of a printed product are set is illustrated as an example. Moreover, since raster data for N×M pages is rasterized and then transmitted, "1" is set to the attribute value of "Copies" in information 811. Moreover, "M" (the number of pages equivalent to one copy) indicating a set (bundle) on which to perform processing (for example, post-processing) is set to the attribute value of "job-pages-per-set" in information 812. Moreover, "normal-job" is set to the attribute value of "job-pages-per-set-type" in information 813. Moreover, "collated-document" is set to the attribute value of "job-collation-type" in information 814. FIG. 8B illustrates an example of the document data to be transmitted. The attribute value indicating that the type of the document data is PWG-Raster is set to information 821, which is the document attribute included in the header. Moreover, data 822 is data obtained by rasterizing N copies×M pages into raster data.

Furthermore, in the present embodiment, the case of expressing the print attribute and the document attribute with use of the attribute names and attribute values of pieces of information 811, 812, 814, and 821, which are defined as the specifications of the IPP as examples of attribute information, is described as an example. Moreover, information 813 is illustrated as an example of an extended print attribute which is not currently incorporated in the specifications of the IPP. This extended specification is attribute information expressly indicating whether processing for each set (bundle) is being used for variable data printing. Here, a case where "normal-job", which indicates that it is not variable data printing, is set is illustrated as an example.

Figure 9B:
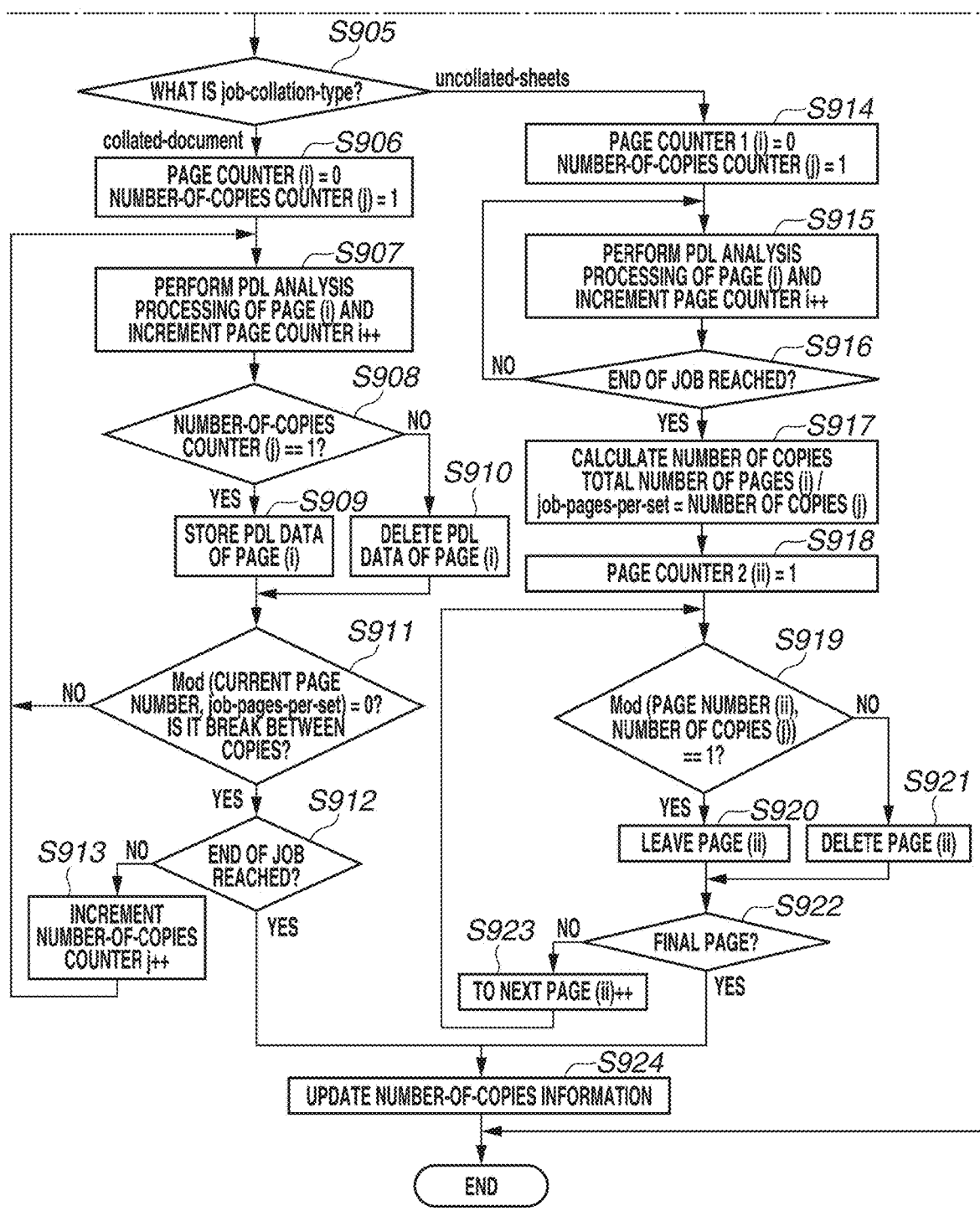
FIG. 9, which is composed of FIGS. 9A and 9B, is a flowchart illustrating an example of control performed by the printing apparatus.

In the present embodiment, when receiving a print job in which the job generation request illustrated in FIG. 8A and the document data illustrated in FIG. 8B are combined, the printing apparatus 101 performs reduction processing for the data size. A specific control method is described with reference to the flowchart of FIG. 9, which is composed of FIGS. 9A and 9B. Furthermore, the processing illustrated in the flowchart of FIG. 9 is performed in a case where the hold printing function of the printing apparatus 101 is set enabled. In a case where the hold printing function is not set enabled, the printing apparatus 101 performs processing for sequentially analyzing the received print job and performing printing, instead of the processing illustrated in the flowchart of FIG. 9.

Each operation (step) illustrated in the flowchart of FIG. 9 is implemented by the CPU 211 reading out a program for implementing each control module stored in the ROM 212 or the storage 214 onto the RAM 213 and executing the program. Furthermore, each processing operation illustrated in the flowchart is assumed to be implemented by the CPU 211 executing a program for implementing control modules illustrated in FIG. 3. Moreover, some processing operations are implemented by a control module implemented by the CPU 211 and each unit such as the image processing unit 217 or the communication unit I/F 223 operating in cooperation with each other.

In step S900, the IPP print service control unit 315 receives a print job. The IPP attribute analysis unit 317 of the IPP print service control unit 315 stores the print attribute of the received print job in the job attribute storing unit 308 of the job control unit 307. Moreover, the IPP print service control unit 315 stores rendering data (PDL data) of the received print job in the data accumulation unit 318 via the data reception control unit 305.

Next, in step S901, the job control unit 307 refers to the attribute indicating the document format stored in the job attribute storing unit 308, and determines whether the file format is a file format for storing raster data. If it is determined that the file format is a file format for storing raster data such as PWG-Raster (YES in step S901), the job control unit 307 advances the processing to step S902. If it is determined that the file format is not a format for storing raster data such as PWG-Raster (for example, the file format is a format which allows storage of data of various formats or attributes such as PDF) (NO in step S901), the job control unit 307 ends the processing without performing a series of reduction processing operations.

In step S902, the job control unit 307 refers to the "Copies" attribute stored in the job attribute storing unit 308, and determines whether a plurality of copies is set to the "Copies" attribute, in a case where the number of copies=1 is set or the number of copies is not expressly set, the job control unit 307 determines that a plurality of copies is not set (NO in step S902), and then advances the processing to step S903. On the other hand, in a case where two or more is set to the "Copies" attribute, the job control unit 307 determines that a plurality of copies is set (YES in step S902), and then ends the processing.

In step S903, the job control unit 307 refers to job-pages-per-set in the job attribute storing unit 308, and determines whether number-of-pages information about a set (bundle) is set. If it is determined that number-of-pages information about a set (bundle) is set (YES in step S903), the job control unit 307 advances the processing to step S904, and, if it is determined that number-of-pages information about a set (bundle) is not set (NO in step S903), the job control unit 307 ends the processing.

In step S904, the job control unit 307 refers to job-pages-per-set-type in the job attribute storing unit 308, and determines whether an attribute in which reduction processing should be not performed is set as the type setting concerning a set (bundle). In a case where an attribute (merge-print-job) for variable data printing, in which different contents are allocated to respective sets (bundles), or an unsupported attribute is set, the job control unit 307 determines that an attribute in which reduction processing should be not performed is set (YES in step S904), and then ends the processing. On the other hand, in a case where an attribute (normal-job) in which the sets (bundles) are the same and processing (for example, post-processing) is performed for each set is set (NO in step S904), the job control unit 307 advances the processing to step S905.

In step S905, the job control unit 307 refers to job-collation-type in the job attribute storing unit 308, and determines whether job-collation-type is a collated job. If it is determined that collated-document is set (collated-document in step S905), the job control unit 307 advances the processing to steps S906 to S924, and, if it is determined that uncollated-sheets is set (uncollated-sheets in step S905), the control unit 307 advances the processing to steps S914 to S924.

In step S906, the job control unit 307 resets a number-of-copies counter, which is a variable, to 1, and resets a page counter, which is included in the page control unit 309, to 0.

In step S907, the job control unit 307 performs page analysis processing for one page in cooperation with the PDL analysis unit 306 and the page control unit 309. Upon completion of analysis for one page, the job control unit 307 increases a count of the page counter included in the page control unit 309 by one increment.

In step S908, the page control unit 309 refers to the number-of-copies counter, which is a variable stored by the job control unit 307, and, if the copy in process is the first copy (YES in step S908), the page control unit 309 advances the processing to step S909, and, if the copy in process is the second or subsequent copy (NO in step S908), the page control unit 309 advances the processing to step S910.

In step S909, the page control unit 309 stores the (i)-th page in the data accumulation unit 318, and then advances the processing to step S911. On the other hand, in step S910, the page control unit 309 deletes (discards) the (i)-th page, and then advances the processing to step S911.

In step S911, the job control unit 307 divides the current page number (i) in process by the value of job-pages-per-set, and, if its remainder is 0, the job control unit 307 determines that a break between copies is reached (YES in step S911), and then advances the processing to step S912. If its remainder is other than 0, the job control unit 307 determines that the current page is in the middle of a copy (NO in step S911), and then returns the processing to step S907 to analyze a next page.

In step S912, the job control unit 307 determines whether the end of job data is reached. The job control unit 307 inquires of the PDL analysis unit 306 about the presence or absence of a subsequent page. The PDL analysis unit 306 notifies the job control unit 307 that there is no subsequent page, in response to the current page having reached the end of data corresponding to the print job stored in the data accumulation unit 318. On the other hand, in a case where the current page has not yet reached the end of data, the PDL analysis unit 306 notifies the job control unit 307 that there is a subsequent page. When receiving a notification indicating that there is no subsequent page, the job control unit 307 determines that the end of job data is reached (YES in step S912), and then advances the processing to step S924. On the other hand, when receiving a notification indicating that there is a subsequent page, the job control unit 307 determines that the end of job data is not reached (NO in step S912), and then advances the processing to step S913.

In step S913, the job control unit 307 increases a count of the number-of-copies counter by one increment, and then returns the processing to step S907.

On the other hand, in step S924, the job control unit 307 overwrites the "Copies" attribute stored in the job attribute storing unit 308 with the number-of-copies information (j) incremented by a series of processing operations. Moreover, the job control unit 307 associates new PDL data generated by a series of processing operations with the print attribute, and deletes PDL data obtained before data reduction processing is performed.

A series of processing operations described in steps S906 to S913 enables performing data reduction of the collated job. A specific example of reduction is described with reference to FIG. 11. Each of schematic views 1110, 1130, and 1150 is used to explain a print job received from the communication apparatus 103, and each of schematic views 1120, 1140, and 1160 is used to explain a job attribute and PDL data to be stored in the storage area. The schematic view 1110 illustrates an example of a print job in which job-pages-per-set indicating a break between sets (bundles) is "2" and a collated job is designated. The schematic view 1120 illustrates an example of a result obtained by performing data reduction and number-of-copies updating processing with the processing in steps S906 to S913 and S924 when the print job illustrated in the schematic view 1110 is received. In this case, the first two pages (P1 and P2) are extracted, and pieces of data rasterized to implement printing of the second copy and the third copy are deleted. Moreover, the attribute indicating the number of copies is updated from one copy to three copies. Accordingly, even when data is reduced, it becomes possible to output an equivalent printed product.

Next, data reduction processing in a case where a received print job has the attribute of an uncollated job is described. The schematic view 1130 is used to explain a print job in which the attribute of an uncollated job is set. While, in the collated job described in the schematic view 1110, data is sorted on a copy-by-copy basis, the uncollated job has such a sequence of pages that page P1 continues for three pages and, after that, page P2 continues for three pages. Accordingly, there is a difference in pages to be extracted and pages to be deleted.

Referring back to the description of FIG. 9, data reduction processing in the case of the uncollated job is described. In step S914, the job control unit 307 resets the number-of-copies counter, which is a variable, to 1, and resets the page counter, which is included in the page control unit 309, to 0.

In step S915, the job control unit 307 performs page analysis processing similar to that in step S907 in cooperation with the PDL analysis unit 306 and the page control unit 309. Upon completion of analysis for one page, the job control unit 307 increases a count of (increments) the page counter included in the page control unit 309.

In step S916, the job control unit 307 determines whether the end of job data is reached. The content of such processing is similar to that in step S912 and is, therefore, omitted from description. If it is determined that the end of job data is reached. (YES in step S916), the job control unit 307 advances the processing to step S917, and, if it is determined that the end of job data is not yet reached (NO in step S916), the job control unit 307 returns the processing to step S915 to perform analysis of a next page.

In step S917, the job control unit 307 derives the number of copies (j) by dividing information about the total number of pages rasterized in the page control unit 309 by the value of job-pages-per-set.

In step S918, the job control unit 307 resets a page counter (ii), which is a second variable used for processing for determining an unnecessary page, and then advances the processing to step S919.

In step S919, the job control unit 307 derives a remainder (Mod) obtained by dividing the page counter (ii) by the number of copies (j). If the derived remainder is 1 (YES in step S919), the job control unit 307 advances the processing to step S920. If the derived remainder is other than 1 (NO in step S919), the job control unit 307 advances the processing to step S921.

In step S920, the job control unit 307 stores the page (ii) in the data accumulation unit 318 in cooperation with the page control it 309, and then advances the processing to step S922. In step S921, the job control unit 307 deletes (discards) the page (ii) in cooperation with the page control unit 309, and then advances the processing to step S922.

In step S922, the job control unit 307 determines whether the determination has been completed to the final page. If it is determined that the determination of all of the pieces of page data has been completed, based on the page counter (ii) and the total number of pages (YES in step S922), the job control unit 307 advances the processing to step S924, in which the job control unit 307 performs update processing of the number of copies, associating of PDL data generated by a series of processing operations with the attribute of the print job, and deletion processing of the original PDL data. On the other hand, if it is determined that the determination of all of the pieces of page data has not yet been completed (NO in step S922), the job control unit 307 advances the processing to step S923. In step S923, the job control unit 307 increases a count of (increments) the page counter (ii), and then returns the processing to step S919.

A series of processing operations described in steps S914 to S924 enables performing data reduction of the uncollated job. An example of a series of data reduction processing operations is described with reference to FIG. 11. The schematic view 1130 illustrates an example of a print job in which job-pages-per-set indicating a break between sets (bundles) is "2" and the uncollated job is designated. The schematic view 1140 illustrates an example of a result obtained by performing data reduction and number-of-copies updating processing with the processing in steps S914 to S924 when the print job illustrated in the schematic view 1130 is received. In this case, pieces of page data of the first page (P1) and the fourth page (P2) from the top are extracted, and pieces of data rasterized to implement printing of the second copy and the third copy (pieces of page data of the second, third, fifth, and sixth pages from the top) are deleted. Moreover, the attribute indicating the number of copies is updated from one copy to three copies. Accordingly, even when data is reduced, it becomes possible to output an equivalent printed product.

Finally, a case where data reduction processing is not performed is described with reference to the schematic views 1150 and 1160. The schematic view 1150 illustrates an example of a print job in which the attribute indicating that the print job is variable data printing is set. The schematic view 1160 illustrates an example of data which is stored to implement the hold printing function. In a case where this attribute is set, different contents may be allocated to respective sets (bundles). Accordingly, even when the job-pages-per-set attribute is set, the job control unit 307 directly stores the received PDL data without performing data reduction processing.

According to the above-described series of processing operations, in a case where a print job which is rasterized to perform printing of a plurality of copies is received, it becomes possible to store data available to output an equivalent printed product while reducing the volume of data of the print job. In FIGS. 9A and 9B, we described an example of the flowchart in a case where a printing apparatus supports various types of jobs, but the case is not limited to this. For example, in a case where a printing apparatus supports only a type of a collated job, the essential elements are a receiving process in step S900, a page extracting process in steps S907 to S910, and a deriving process in steps S911 to S913.

A print job which has been stored in the storage area of the printing apparatus 101 by the processing operations illustrated in the flowchart of FIG. 9 is selected by the user operation performed via the operation unit 216 as illustrated in FIG. 2 and is then printed as appropriate. Display control which is implemented by the CPU 211 and the operation unit 216 operating in cooperation with each other in the above-mentioned case is described with reference to FIGS. 12A, 12B, and 12C. FIGS. 12A to 12C illustrate examples of screens concerning the hold printing function. FIG. 12A illustrates an example of a selection screen for data which is held by the hold printing function. When receiving a user operation to select an icon for using the hold printing function from a function selection screen (not illustrated) displayed on the operation unit 216, the CPU 211 displays a selection screen on the operation unit 216. A list of pieces of data which are held is displayed in the selection screen. The user is allowed to select desired data and issue an instruction for printing.

In FIG. 12A, a case where an item 1211 is selected by the user operation is illustrated as an example. Moreover, the item 1211 is assumed to correspond to the data subjected to data reduction processing illustrated in the schematic view 1120 in FIG. 11.

The user is allowed to use an edit key 1212 to change the print setting. When detecting that the edit key 1212 has been selected, the CPU 211 displays an edit screen on the operation unit 216. FIG. 129 illustrates an example of the edit screen. Information 1221 indicating the number of pages in one set and a display item 1222 available to receive changing of the number of copies are displayed in the edit screen. The number of pages in one set and the number of copies are displayed based on the attribute which has been updated by a series of processing operations illustrated in FIG. 9. Accordingly, it is possible to perform displaying which does not give the user a feeling of strangeness. Moreover, in a case where the number of copies is edited, it is also possible to perform an operation which does not cause a feeling of strangeness. Moreover, a configuration in which, for example, a preview screen (not illustrated) is displayed can also be employed. Even in this case, since a thumbnail that is based on the extracted page data is displayed, it is possible to perform displaying which does not give the user a feeling of strangeness. The user is allowed to use a print key 1223 to issue an instruction to print data that is currently selected. Upon detecting that the print key 1223 has been selected, the CPU 211 instructs the job control unit 307 to execute the print job corresponding to the user selection. A screen such as that illustrated in FIG. 12C may be displayed to confirm to the user that printing is in progress. On the screen of FIG. 12C, information indicating the number of pages in one set and information indicating the number of copies are displayed. The job control unit 307 generates a printed product that is based on the print job in cooperation with the various units.

Next, generation processing for a print job which is performed by any one of the communication apparatuses 103a to 103c is described with reference to the flowchart of FIG. 10. Here, processing concerning generation of a print job which is executed after an IPP print client is invoked for printing is excerpted. As a premise, it is supposed that, prior to the processing illustrated in FIG. 10 being performed, the print setting is performed via the print setting screen described in step S605 in the sequence diagram of FIG. 6 and the setting for using the printing apparatus 101 to perform printing is performed.

Figure 10:
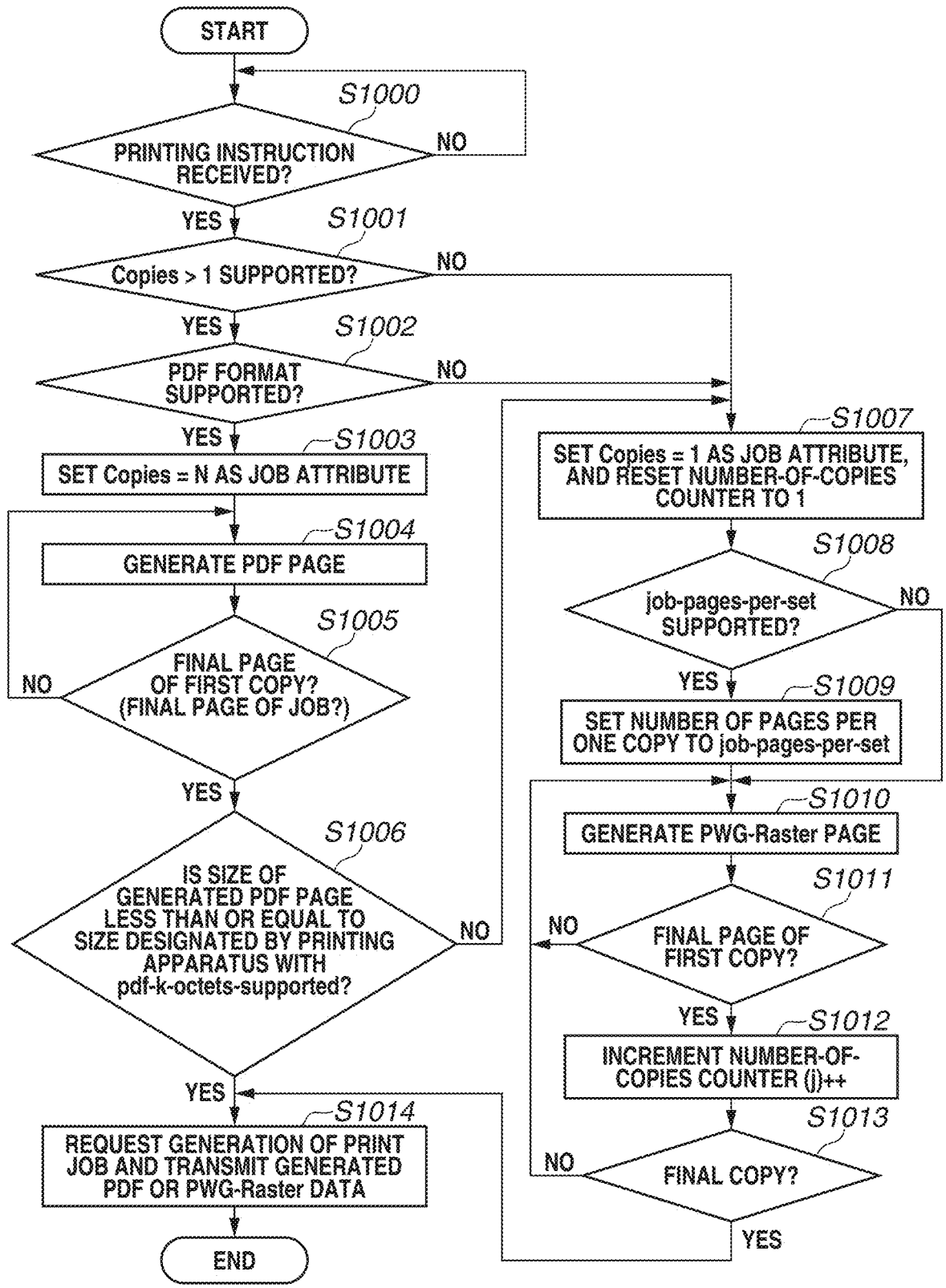
FIG. 10 is a flowchart illustrating an example of control performed by the communication apparatus.

Each operation (step) illustrated in the flowchart of FIG. 10 is implemented by the CPU 401 reading out a program for implementing each control module stored in the ROM 402 or the storage 404 onto the RAM 403 and executing the program. Furthermore, each processing operation illustrated in the flowchart is assumed to be implemented by the CPU 401 executing a program for implementing control modules illustrated in FIG. 5. Moreover, some processing operations are implemented by a control module implemented by the CPU 401 and each unit such as the communication unit I/F 406 operating in cooperation with each other.

In step S1000, the IPP client 503 determines whether a printing instruction has been received. If it is determined that the printing instruction has been received (YES in step S1000), the IPP client 503 advances the processing to step S1001, and, if it is determined that the printing instruction has not been received (NO in step S1000), the IPP client 503 waits for receiving of the printing instruction via the operation unit 408.

In step S1001, the print job generation unit 504 determines whether a printing apparatus serving as a destination supports printing of a plurality of copies. Specifically, the print job generation unit 504 inquires of the printer information management unit 511 whether the printing apparatus serving as a destination supports "Copies" (printing of a plurality of copies). If, as a result of the inquiry, it is determined that the printing apparatus serving as a destination supports printing of a plurality of copies (YES in step S1001), the print job generation unit 504 advances the processing to step S1002, and, if it is determined that the printing apparatus serving as a destination does not support printing of a plurality of copies (NO in step S1001), the print job generation unit 504 advances the processing to step S1007.

In step S1002, the print job generation unit 504 determines whether the printing apparatus serving as a destination supports the PDF format. Specifically, the print job generation unit 504 inquires of the printer information management unit 511 about the attribute value indicating a list of formats supported by the printing apparatus serving as a destination. If it is determined based on the attribute value obtained as a result of the inquiry that the printing apparatus serving as a destination supports the PDF format (YES in step S1002), the print job generation unit 504 advances the processing to step S1003, and, if it is determined that the printing apparatus serving as a destination does not support the PDF format (NO in step S1002), the print job generation unit 504 advances the processing to step S1007.

In step S1003, the print job generation unit 504 acquires setting of the number of copies performed via the print setting screen, and sets the number of copies for printing to the attribute of the print job. The print job generation unit 504 requests the job attribute generation unit 506 to generate the print attribute indicating that "Copies" is N. Here, a case where "N copies" is set via the print setting screen is illustrated as an example.

In step S1004, the print job generation unit 504 generates a PDF page in cooperation with the page generation unit 507, the OS rendering engine 514, and the PDL generation unit 508. The generated PDF page is accumulated in the page accumulation unit 515.

In step S1005, the page generation unit 507 inquires of the OS rendering engine 514 about the presence or absence of a subsequent page, and thus determines whether the processing has been completed to the final page. If it is determined that the processing has been completed to the final page (YES in step S1005), the page generation unit 507 advances the processing to step S1006, and, if it is determined that the processing has not yet been completed to the final page (NO in step S1005), the page generation unit 507 returns the processing to step S1004, in which the page generation unit 507 receives a subsequent page from the OS rendering engine 514 and continues generation processing for a PDF page.

In step S1006, the print job generation unit 504 determines whether the generated PDF page exceeds the maximum size supported by the printing apparatus serving as a destination. Specifically, the print job generation unit 504 inquires of the printer information management unit 511 about the attribute value of pdf-k-octets-supported stored in association with the printing apparatus serving as a destination. Then, the print job generation unit 504 determines, based on the size of the PDF page generated by the processing in steps S1004 to S1005 and the acquired attribute value, whether the printing apparatus serving as a destination is able to receive the PDF page. If it is determined that the printing apparatus serving as a destination is able to receive the PDF page (YES in step S1006), the print job generation unit 504 advances the processing to step S1014, and, if it is determined that the printing apparatus serving as a destination is not able to receive the PDF page (NO in step S1006), the print job generation unit 504 advances the processing to step S1007. This processing is exception processing for preventing or reducing such an error that, in the printing apparatus serving as a destination, a size upper-limit error occurs and printing is thus unable to be performed.

In step S1014, in cooperation with the print spooler 509 and the data communication control unit 510, the TPP client 503 requests the printing apparatus serving as a destination to generate a print job, and transmits page data thereto. The print attribute included in the request or the document attribute included in the header of the page data has, appended thereto, for example, a print attribute that is based on a print setting set by the user operation or attribute information indicating the format of the page data.

Next, a case where a print job of the raster format, such as the PWG-Raster format, is transmitted is described in step S1007 and subsequent steps.

In step S1007, the print job generation unit 504 sets the number of copies=1 as the job attribute, and resets the number-of-copies counter, which is a variable, to 1. Specifically, the print job generation unit 504 requests the job attribute generation unit 506 to change the "Copies" attribute to 1. Moreover, the print job generation unit 504 resets the number-of-copies counter, which is a variable that is temporarily retained within the print job generation unit 504, to 1.

In step S1008, the print job generation unit 504 determines whether the printing apparatus serving as a destination supports a job in which a set (bundle) indicating a unit of processing for performing processing (for example, post-processing) designated. Specifically, the print job generation unit 504 inquires of the printer information management unit 511 whether job-pages-per-set is supported. If, as a result of the inquiry, it is determined that the printing apparatus serving as a destination supports job-pages-per-set (YES in step S1008), the print job generation unit 504 advances the processing to step S1009, and, if it is determined that the printing apparatus serving as a destination does not support job-pages-per-set (NO in step S1008), the print job generation unit 504 skips the processing in step S1009 and advances the processing to step S1010.

In step S1009, the job attribute generation unit 506 sets the number of pages per one copy to the attribute of job-pages-per-set, and then advances the processing to step S1010.

In step S1010, the print job generation unit 504 generates a page of the PWG-Raster format in cooperation with the OS rendering engine 514 and the PDL generation unit 508. The generated page of the PWG-Raster format is stored in the page accumulation unit 515.

In step S1011, the page generation unit 507 determines whether the current page is the final page. If it is determined that the current page is the final page (YES in step S1011), the page generation unit 507 advances the processing to step S1012, and, if it is determined that the current page is not the final page (NO in step S1011), the page generation unit 507 returns the processing to step S1010. The specific processing content in step S1011 is similar to that in step S1005, and is, therefore, omitted from description.

In step S1012, the print job generation unit 504 increases the count of (increments) the number-of-copies counter.

In step S1013, the print job generation unit 504 determines whether rasterization of pages that is based on the number of copies for printing set by the user has been completed. In a case where the number-of-copies counter and the number of copies for printing set by the user coincide with each other, the print job generation unit 504 determines that the rasterization of pages has been completed (YES in step S1013), and then advances the processing to step S1014. On the other hand, if the number-of-copies counter and the number of copies for printing set by the user do not coincide with each other (NO in step S1013), the print job generation unit 504 returns the processing to step 51010, in which the print job generation unit 504 performs regeneration of page data that is based on OS rendering data. Furthermore, regeneration of page data can be replaced by processing for duplicating raster data generated in step S1010.

According to the above-described processing, in a case where it is impossible to transmit a print job in the PDF format, the communication apparatus 103 is able to transmit the print job in the PWG-Raster mode. Moreover, in the case of transmitting a print job rasterized for printing of a plurality of copies, the communication apparatus 103 is able to append attribute information (for example, job-pages-per-set) for performing processing for each set, the set being composed of one or more pages, to the print job. In this way, in a case where data is rasterized for printing of a plurality of copies, the communication apparatus 103 is able to transmit a print job to which attribute information indicating that such rasterization has been performed is appended. Accordingly, the printing apparatus 101 becomes able to attempt to perform reduction processing for data with the attribute information used as a clue.

Modification Examples

Furthermore, while, in the present embodiment, the printing apparatus 101 including a printing unit is illustrated as an example of a print control apparatus and a print job is stored in a storage area of the printing apparatus 101, the present embodiment is not limited to such a configuration. For example, the present embodiment can also be applied to a case where a print job is stored in a print control apparatus, such as a print server, connected to a printing apparatus in such a way as to be able to communicate therewith. In this case, the print server behaves as a virtual printer. The print server performs each processing operation illustrated in the flowchart of FIG. 9, attempts to perform data reduction processing on a print job received from an IPP client, and stores the print job in a storage area inside the print server. In response to an acquisition request from the printing apparatus, the print server transmits print data stored in the storage area to the printing apparatus. For example, in response to the user logging in to the printing apparatus, the printing apparatus transmits an acquisition request for the user's print job to the print server. The print server searches for the appropriate print job. The print server transmits the print job found by searching as a response to the acquisition request. These print servers can be implemented in a dispersed manner on a cloud server.

Moreover, while, in the present embodiment, as an example of generation processing for a print job which is performed at the side of the communication apparatus 103, a case where, when the PDF format is not supported, rasterization processing for the number of copies is performed without exception is described, the present embodiment is not limited to this. For example, in a case where the printing apparatus serving as a destination satisfies such a condition as to support "Copies>1" and not to support PDF, the communication apparatus 103 can assign "Copies=N" to the printing attribute and generate PWG-Raster data for one copy.

Moreover, while, in the present embodiment, a case where job-pages-per-set, which is defined as the specifications for post-processing in the IPP, is utilized as attribute information indicating that data has been rasterized for printing of a plurality of copies, the present embodiment is not limited to this. For example, new attribute information indicating that data has been rasterized for printing of a plurality of copies can be defined and the new attribute information can be utilized. In this case, the communication apparatus 103 assigns information indicating the number of pages per one copy as an attribute value corresponding to the attribute information indicating that data has been rasterized for printing of a plurality of copies. The printing apparatus 101, which has received a print job including such attribute information, can perform the above-mentioned data reduction processing with use of the attribute value.

As described above, in a case where a print job rasterized for printing of a plurality of copies is received, it becomes possible to, while reducing the volume of data of the print job, store data available to output a printed product for a plurality of copies which is desired by the user.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. It will of course be understood that this invention has been described above by way of example only, and that modifications of detail can be made within the scope of this invention.

This application claims the benefit of Japanese Patent Application No. 2018-077927 filed Apr. 13, 2018, which is hereby incorporated by reference herein in its entirety.

What is claimed is:

1. A print control apparatus comprising:
   at least one memory that stores a set of instructions; and
   at least one processor that executes the set of instructions, the set of instructions, when executed, causing the print control apparatus to perform operations comprising:
   receiving, from an external apparatus, a print job including image data of a plurality of pages corresponding to a plurality of copies of one set and information indicating a number of pages of the one set;
   extracting image data, which is to be used for outputting of the one set, from the received image data based on the information indicating the number of pages of the one set; and
   storing, in a storage area, data including the extracted image data to be used for outputting one set and a number of copies derived based on a total number of the plurality of pages and the received information,
   wherein, among the received image data, image data excluding the extracted image data is not stored in the storage area.

2. The print control apparatus according to claim 1, wherein the operations further comprise deriving the number of copies based on the information and the total number of the plurality of pages.

3. The print control apparatus according to claim 2, wherein the operations further comprise:
   selecting data to be printed from among data stored in the storage area; and
   displaying, on a display device, the derived number of copies in response to receiving a user instruction concerning the selected data to be printed.

4. The print control apparatus according to claim 3, further comprising a printing apparatus,
   wherein the operations further comprise controlling the printing apparatus to print an image on a sheet based on the selected data to be printed.

5. The print control apparatus according to claim 3, wherein the operations further comprise transmitting the selected data to be printed to a printing apparatus.

6. The print control apparatus according to claim 1, wherein the information is a job-pages-per-set attribute defined in Internet Printing Protocol (IPP), in which a number of pages indicating one set is designated.

7. The print control apparatus according to claim 1, wherein the operations further comprise, in a case where another print job received does not include the information, storing whole image data included in the another print job.

8. The print control apparatus according to claim 1, wherein the print data is extracted by leaving image data to be used for outputting one set of printed product from the received image data based on the information and deleting image data other than the left rendering data.

9. The print control apparatus according to claim 1, wherein the image data is raster data.

10. A control method for a print control apparatus, the control method comprising:
receiving, from an external apparatus, a print job including image data of a plurality of pages corresponding to a plurality of copies of one set and information indicating a number of pages of the one set;
extracting image data, which is to be used for outputting of the one set, from the received image data based on the information indicating the number of pages of the one set; and
storing, in a storage area, data including the extracted image data to be used for outputting one set and a number of copies derived based on a total number of the plurality of pages and the received information,
wherein, among the received image data, image data excluding the extracted image data is not stored in the storage area.

11. A computer-readable storage medium storing a program for causing a computer to execute a print control method to be performed by a print control apparatus, the print control method comprising:
receiving, from an external apparatus, a print job including image data of a plurality of pages corresponding to a plurality of copies of one set and information indicating a number of pages of the one set;
extracting image data, which is to be used for outputting of the one set, from the received image data based on the information indicating the number of pages of the one set; and
storing, in a storage area, data including the extracted image data to be used for outputting one set and a number of copies derived based on a total number of the plurality of pages and the received information,
wherein, among the received image data, image data excluding the extracted image data is not stored in the storage area.

* * * * *